(12) United States Patent
Engelberg et al.

(10) Patent No.: US 12,165,178 B1
(45) Date of Patent: Dec. 10, 2024

(54) SYSTEMS AND METHODS TO GENERATE SUBSCRIPTION RECOMMENDATIONS WITHIN A MEMBERSHIP PLATFORM

(71) Applicant: PATREON, INC., San Francisco, CA (US)

(72) Inventors: Jesse Aaron Engelberg, San Francisco, CA (US); Nikhil Purushottam Harithas, San Francisco, CA (US); Andre Milton Bach, San Francisco, CA (US)

(73) Assignee: PATREON, INC., San Francisco, CA (US)

( * ) Notice: Subject to any disclaimer, the term of this patent is extended or adjusted under 35 U.S.C. 154(b) by 71 days.

(21) Appl. No.: 17/353,751

(22) Filed: Jun. 21, 2021

(51) Int. Cl.
*G06Q 30/00* (2023.01)
*G06F 16/2457* (2019.01)
(Continued)

(52) U.S. Cl.
CPC ... *G06Q 30/0282* (2013.01); *G06F 16/24578* (2019.01); *G06F 16/955* (2019.01); *G06Q 30/0201* (2013.01)

(58) Field of Classification Search
CPC ............ G06Q 30/0282; G06Q 30/0201; G06F 16/24578; G06F 16/955
See application file for complete search history.

(56) References Cited

U.S. PATENT DOCUMENTS 7,921,028 B2 4/2011 Cole
8,051,040 B2 11/2011 Johnson
(Continued)

FOREIGN PATENT DOCUMENTS

JP 2019191623 A 10/2019
KR 20190119773 A 10/2019
(Continued)

OTHER PUBLICATIONS

Author(s): Osuala Title: Impact of subscription based crowdfunding on creators online channels Journal: ERF [online]. Publication date: 2019.[retrieved on: Feb. 23, 2023 ]. Retrieved from the Internet: < URL: https://aisel.aisnet.org/cgi/viewcontent.cgi?article=1017 &context=amcis2019> (Year: 2019).*

(Continued)

*Primary Examiner* — Maria V Vanderhorst
(74) *Attorney, Agent, or Firm* — Esplin & Associates, PC

(57) ABSTRACT

Systems and methods are provided to generate subscription recommendations within a membership platform. Exemplary implementations may: obtain subscribership information for subscribers of a membership platform; for an individual subscriber, identify other ones of the subscribers who commonly subscribe to the content creators subscribed to by the individual subscriber; for individual ones of the other ones of the subscribers, identify other ones of the content creators the other ones of the subscribers subscribe to but the individual subscriber does not; for individual ones of the other ones of the content creators, determine individual quantities of the other ones of the subscribers that are commonly subscribed; rank the other ones of the content creators based on the individual quantities; generate one or more subscription recommendations; effectuate presentation of the one or more subscription recommendations; and/or perform other operations.

20 Claims, 4 Drawing Sheets

(51) Int. Cl.
  *G06F 16/955* (2019.01)
  *G06Q 30/0201* (2023.01)
  *G06Q 30/0282* (2023.01)
  *G05B 19/418* (2006.01)

(56) References Cited

U.S. PATENT DOCUMENTS

| | | | |
|---|---|---|---|
| 8,375,024 | B2 | 2/2013 | Goeldi |
| 8,712,376 | B2 | 4/2014 | Strickon |
| 8,850,490 | B1 | 9/2014 | Thomas |
| 9,035,163 | B1 | 5/2015 | Mohajer |
| 9,060,249 | B2 | 6/2015 | Meredith |
| 9,558,277 | B2 | 1/2017 | Pappas |
| 9,734,521 | B2 | 8/2017 | Curtis |
| 9,767,208 | B1 | 9/2017 | Chow |
| 9,870,581 | B1 | 1/2018 | Vormweg |
| 10,356,574 | B1 * | 7/2019 | Wood .................... H04W 4/021 |
| 10,394,408 | B1 | 8/2019 | Freund |
| 10,607,242 | B1 | 3/2020 | Wood |
| 10,621,532 | B1 | 4/2020 | Conte |
| 10,936,986 | B2 | 3/2021 | Conte |
| 10,937,042 | B2 | 3/2021 | Wood |
| 11,049,191 | B1 | 6/2021 | Wilczek |
| 11,238,542 | B1 | 2/2022 | Wixted |
| 11,270,330 | B1 | 3/2022 | Brini |
| 2002/0036654 | A1 | 3/2002 | Evans |
| 2002/0062252 | A1 | 5/2002 | Van Zoest |
| 2002/0103698 | A1 | 8/2002 | Cantrell |
| 2005/0087594 | A1 | 4/2005 | Phillips |
| 2006/0053290 | A1 | 3/2006 | Randle |
| 2007/0038516 | A1 | 2/2007 | Apple |
| 2007/0069013 | A1 | 3/2007 | Seifert |
| 2007/0164554 | A1 | 7/2007 | Krone |
| 2008/0120185 | A1 | 5/2008 | Evans |
| 2008/0183577 | A1 | 7/2008 | Evans |
| 2008/0215467 | A1 | 9/2008 | Huffman |
| 2008/0243693 | A1 | 10/2008 | Thrasher |
| 2008/0243802 | A1 | 10/2008 | Han |
| 2008/0265020 | A1 | 10/2008 | Copeland |
| 2009/0069911 | A1 | 3/2009 | Stefik |
| 2009/0158318 | A1 | 6/2009 | Levy |
| 2009/0234710 | A1 | 9/2009 | Belgaied Hassine |
| 2011/0191246 | A1 | 8/2011 | Brandstetter |
| 2011/0258049 | A1 | 10/2011 | Ramer |
| 2011/0295722 | A1 | 12/2011 | Reisman |
| 2012/0054666 | A1 | 3/2012 | Baird-Smith |
| 2012/0179556 | A1 | 7/2012 | Ertas |
| 2012/0190386 | A1 | 7/2012 | Anderson |
| 2012/0272278 | A1 | 10/2012 | Bedi |
| 2012/0278725 | A1 | 11/2012 | Gordon |
| 2012/0311462 | A1 | 12/2012 | Devecka |
| 2013/0080328 | A1 | 3/2013 | Royyuru |
| 2013/0197979 | A1 | 8/2013 | Han |
| 2013/0226691 | A1 | 8/2013 | Chatow |
| 2013/0275429 | A1 | 10/2013 | York |
| 2014/0025473 | A1 | 1/2014 | Cohen |
| 2014/0032326 | A1 | 1/2014 | Li |
| 2014/0058938 | A1 | 2/2014 | McClung, III |
| 2014/0067554 | A1 | 3/2014 | Heppding |
| 2014/0067702 | A1 | 3/2014 | Rathod |
| 2014/0122507 | A1 | 5/2014 | Zeng |
| 2014/0164049 | A1 | 6/2014 | Yakos |
| 2014/0164514 | A1 | 6/2014 | Eteminan |
| 2014/0214641 | A1 | 7/2014 | Acker, Jr. |
| 2014/0280121 | A1 | 9/2014 | Sharp |
| 2014/0324604 | A1 | 10/2014 | Munoz Torres |
| 2014/0366047 | A1 | 12/2014 | Thomas |
| 2015/0066189 | A1 | 3/2015 | Mulligan |
| 2015/0066675 | A1 | 3/2015 | Camelio |
| 2015/0161692 | A1 | 6/2015 | Tembo |
| 2015/0193889 | A1 | 7/2015 | Garg |
| 2015/0363899 | A1 | 12/2015 | Krause |
| 2016/0071058 | A1 | 3/2016 | Galuten |
| 2016/0080485 | A1 | 3/2016 | Hamedi |
| 2016/0124918 | A1 | 5/2016 | Ying |
| 2016/0189198 | A1 | 6/2016 | McKenzie |
| 2016/0210650 | A1 | 7/2016 | Sewell |
| 2016/0232480 | A1 | 8/2016 | Erez |
| 2016/0239807 | A1 | 8/2016 | Creighton |
| 2016/0357376 | A1 | 12/2016 | Carrigan |
| 2017/0017978 | A1 | 1/2017 | Wallace |
| 2017/0076348 | A1 | 3/2017 | Jennings |
| 2017/0083930 | A1 | 3/2017 | Nagaraj |
| 2017/0161794 | A1 | 6/2017 | Zhu |
| 2017/0337621 | A1 | 11/2017 | Peters |
| 2018/0040019 | A1 | 2/2018 | Gavlovski |
| 2018/0075147 | A1 | 3/2018 | Bagheri |
| 2018/0121973 | A1 | 5/2018 | Dimascio |
| 2018/0144052 | A1 | 5/2018 | Sayyadi-Harikandehei |
| 2018/0181964 | A1 | 6/2018 | Zagarese |
| 2018/0285933 | A1 * | 10/2018 | Lee-Chan .......... G06Q 30/0269 |
| 2018/0365709 | A1 | 12/2018 | Modani |
| 2019/0026280 | A1 | 1/2019 | Aviyam |
| 2019/0026782 | A1 | 1/2019 | McGrath |
| 2019/0164082 | A1 | 5/2019 | Wu |
| 2019/0290965 | A1 | 9/2019 | Oren |
| 2019/0361577 | A1 | 11/2019 | Burns |
| 2020/0007934 | A1 | 1/2020 | Ortiz |
| 2020/0020014 | A1 | 1/2020 | Jin |
| 2020/0089724 | A1 | 3/2020 | Zimovnov |
| 2020/0134696 | A1 | 4/2020 | Lardeux |
| 2020/0219025 | A1 | 7/2020 | Conte |
| 2020/0219114 | A1 | 7/2020 | Wood |
| 2020/0300538 | A1 | 9/2020 | Avakian |
| 2020/0311751 | A1 | 10/2020 | Shi |
| 2020/0320571 | A1 | 10/2020 | Singh |
| 2020/0351561 | A1 | 11/2020 | Spencer |
| 2020/0401647 | A1 | 12/2020 | Reich |
| 2021/0133651 | A1 | 5/2021 | Conte |
| 2021/0133775 | A1 | 5/2021 | Wood |
| 2021/0158317 | A1 | 5/2021 | Kurylko |
| 2021/0192460 | A1 | 6/2021 | Xu |
| 2021/0216976 | A1 | 7/2021 | Kaufman |
| 2022/0277356 | A1 | 9/2022 | Russo |
| 2022/0318704 | A1 | 10/2022 | Brini |
| 2022/0377399 | A1 | 11/2022 | Bonner |
| 2023/0153840 | A1 | 5/2023 | Wood |
| 2023/0162118 | A1 | 5/2023 | Conte |
| 2023/0206154 | A1 | 6/2023 | Brini |
| 2023/0245162 | A1 | 8/2023 | Thomas |
| 2023/0252097 | A1 | 8/2023 | Church |
| 2023/0325866 | A1 | 10/2023 | Harithas |

FOREIGN PATENT DOCUMENTS

| | | | | |
|---|---|---|---|---|
| WO | WO-2009045899 | A2 * | 4/2009 | ............. G06Q 30/02 |
| WO | 2020223620 | A1 | 11/2020 | |

OTHER PUBLICATIONS

Author(s): Rakesh Title: Personalized recommendations of twitter lists using content and network information Journal: AAAI [online]. Publication date: 2014.[retrieved on: Sep. 29, 2023 ]. Retrieved from the Internet: < URL: https://ojs.aaai.org/index.php/ICWSM/article/view/14558> (Year: 2014).*

"Aatish—A New Profile-Based Recommendation Services for Mobile Telecom Network Subscribers". IEEE. 2015. (Year: 2015).*

"Video content recommendation: An overview and discussion on technologies and business models". IEEE. 2014. (Year: 2024).*

Mattison, David, "Reality Check for your Muses: Creativity and Business Innovation Resources", Searcher; Medford vol. 16, Iss. 10, (Nov./Dec. 2008): 16-21, 55-59. (Year: 2008).

Ondrejka, Cory, "Escaping the gilded cage: User created content and building the metaverse", 49 N.Y.L. Sch. L. Rev. 81 (2004). (Year: 2004) (23 pages).

Vanderhoef, II, Robert John, et. al., "An Industry of Indies: The New Cultural Economy of Digital Game Production", University of California, Santa Barbara, Sep. 2016, pp. 1-259. (Year: 2016).

Harris, William. "26 Inexpensive Customer Delight Ideas Worth Trying to Fuel Business Growth" Sellbrite, Jun. 2016, https://ww.sellbrite.com/blog/customer-delight/(Year: 2016).

(56) References Cited

OTHER PUBLICATIONS

Hyken, Shep. "Seven Ways to Properly Give a Gift to Your Customers" Shep Hyken's Blog, Jun. 2016, https://hyken.com/internal-customers/seven-ways-properly-give-gift-customers/ (Year: 2016).

Miller, Nicole. "Inside Buffer's Community Delight Headquarters: How and Why We Send Swag and What It All Costs" Buffer, Apr. 27, 2015, https://buffer.com/resources/community-delight/ (Year: 2015).

Shipwire. "Marketing inserts" Shipwire support, Feb. 27, 2015, https://www.shipwire.com/w/support/marketing-inserts/ (Year: 2015).

Yarbro, Printify Vs. Printful: Pros and Cons, Dec. 9, 2019, nomadicwander, https://nomadicwander.com/2019/12/09. printify-vs-printful-pros-and-cons/ (Year:2019).

J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.

F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).

Gerri Detweiler, Reward Crowdfunding, Mar. 20, 2020, Nav, 11 pages, https://www.nav.com/business-financing-options reward-crowdfunding/ (Year: 2020).

Investing in Games With Fig Game Shares,Feb. 28, 2019, fig.co, 12 pages, https://www.fig.co/invest#rewards-based-crowdfunding (Year: 2019).

L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/ PICMET. 2018.8481838. (Year: 2018).

Lopez et al., A Recommender System Based on a Machine Learning Algorithm for B2C Portals; Published in: 2009 IEEE/WIC/ACM International Joint Conference on Web Intelligence and Intelligent Agent Technology Date of Conference: Sep. 15-18, 2009 (Year: 2009).

Massimiliano Barbi and Marco Bigelli, Crowdfunding practices in and outside the US, Jun. 2017, 47 pages, ResearchGate DOI: 10.1016/ j.ribaf.2017.05.013 (Year: 2017).

Wilson et al., Real World Applications of Machine Learning Techniques over Large Mobile Subscriber Datasets, SE4ML: Software Engineering for Machine Learning , 9 pages, Arxiv ID: 1502.02215 Publication Date: Feb. 8, 2015 (Year: 2015).

Content and conduit: Relative profitability in the new era of television Todreas, Timothy Michael. ProQuest Dissertations and Theses, ProQuest Dissertations Publishing. (1996) (Year: 1996) 431 pages.

Iulia, "9 social media apps paying their content creators", May 16, 2021 (Year: 2021) 4 pages.

Perez, "Watchworthy's personalized TV recommendation app will help you find your next binge", Mar. 24, 2020 (Year: 2020) 4 pages.

Fischer, "Ad models break everyone's brains': How Patreon and Substack are trying to make the internet a better place with membership and subscriptions" (Aug. 11, 2019) (Year: 2019).

Masters of media, Substack: Against the advertising model, 2019 (Year: 2019).

Shariatmadari, Ali. "Data Dissemination using Information-Centric Networking." Order No. 10194046 University of Toronto (Canada) , 2016. Ann Arbor (Year: 2016).

Han, "Online contents funding system and method based upon matching with contents creator and investor", Translation of KR Pub No. 20190119773 A (2019) (Year: 2019) 15 pages.

Collabstr.com, "Find and Hire Influencers in Seconds" (Aug. 11, 2019) (Year: 2019) 7 pages.

\* cited by examiner

SYSTEMS AND METHODS TO GENERATE SUBSCRIPTION RECOMMENDATIONS WITHIN A MEMBERSHIP PLATFORM

FIELD

The disclosure relates to systems and methods to generate subscription recommendations within a membership platform.

BACKGROUND

Different platforms may be utilized by entities seeking contributions from the general public to obtain a needed or desired service(s) and/or resource(s). Some of these platforms facilitate raising resources (i.e., funds) from the users through monetary contributions or donations to support a project. Oftentimes, supporters of a project are given rewards or special perks, where the size and/or exclusivity of the rewards or special perks may depend on the amount contributed.

SUMMARY

A membership platform may be comprised of users including one or more of content creators, subscribers, and/or other users. Content creators may be users of the membership platform who offer content (also referred to as "benefit items") to subscribers in exchange for consideration. A "benefit item" may refer to a good and/or service. A good may comprise a physical good and/or a digital good (e.g., "online" content). In some implementations, subscribers may donate funds to a content creator such that the benefit item may be the altruism in supporting the content creator. Subscribers may be users of the membership platform who subscribe, through payment of a one-time and/or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, content types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

The present disclosure addresses one or more problems in determining how to recommend new subscriptions to subscribers. Traditionally, recommendations may come from analyzing a subscriber's list of subscribed-to content creators, and then finding "related" content creators to recommend. The relatedness may derive from classifying the content creators into categories, typically by the "type" of content they create. However, some traditional approaches to classifying content creators and generating subscription recommendations may be too rigid and may not always result in the realization of new subscriptions. For example, only a narrow range of content creators may actually be recommended. This reduces the potential reach that certain content creator's may obtain with their audience and limits the scope of content the subscribers may be exposed to. Accordingly, there is a need to determine, in a computationally efficient manner, subscription recommendations within a membership platform which lead to a higher realization of new paid subscriptions, and allows for better exposure for content creators within a broad and varying network of content creators.

One aspect of the present disclosure relates to a system configured to generate subscription recommendations within a membership platform. As a basic summary, the system may start identifying a given subscriber. The system may consider the content creators the given subscriber subscribes to. The system may look at the other subscribers who commonly subscribe (e.g., subscribership is "in common") to those content creators. The system may identify other content creators those other subscribers subscribe to, but the given subscriber does not. These steps may generate a network, where the given subscriber is now linked to one or more new (meaning not-yet-subscribed-to) content creators by at least one subscriber connection. Within this network, the system may then count the subscriber connections between the given subscriber and individual ones of the new content creators. The system may rank the new content creators according to the count and/or other metrics. One or more relatively highest ranked content creators may be the subject of a subscription recommendation sent to the given subscriber. These and/or other features and/or functionality will become apparent to a person of ordinary skill in the art upon a reading of this disclosure.

The system may include one or more hardware processors configured by machine-readable instructions and/or other components. The machine-readable instructions may include one or more computer program components. The computer program components may include one or more of a subscriber component, a ranking component, a recommendation component, a presentation component, and/or other computer program components.

The subscriber component may be configured to obtain subscribership information for subscribers who subscribe to content creators of a membership platform. The content creators may offer benefit items to the subscribers of the membership platform who subscribe to the content creators in exchange for consideration. The subscribership information may characterize subscribership of individual ones of the subscribers to one or more of the content creators.

The ranking component may be configured to identify, for an individual subscriber, the content creators subscribed to by the individual subscriber. The ranking component may be configured to identify, for the individual subscriber, other ones of the subscribers who commonly subscribe to the content creators subscribed to by the individual subscriber. The ranking component may be further configured to identify, for individual ones of the other ones of the subscribers, other ones of the content creators the other ones of the subscribers subscribe to, but the individual subscriber does not.

The ranking component may be configured to determine, for individual ones of the other ones of the content creators, individual quantities of the other ones of the subscribers that are commonly subscribed. The ranking component may be configured to rank the other ones of the content creators based on the individual quantities and/or other information.

The recommendation component may be configured to generate one or more subscription recommendations for one or more of the other ones of the content creators based on the rank. An individual subscription recommendation may include a recommendation to subscribe to an individual content creator.

The presentation component may be configured to effectuate presentation of the one or more subscription recommendations to an individual computing platform of the individual subscriber.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some entities may seek to obtain funds through subscriptions. Such entities may utilize online membership platforms that allow consumers to sign up for ongoing payments in exchange for rewards and/or other membership benefits. Entities seeking funding may be content creators, for example, artists, musicians, educators, speakers, etc. Content creators may create content, which may refer to one or more of information, experiences, products, and/or other content provided to an audience or end-user, whether it be digital, analog, virtual, and/or other form. For example, types of content may include but is not limited to online content such as video content, podcasts, photographic art, webcomics, do-it-yourself crafts, digital music, performance art, and/or other types of content. Content creators may utilize membership platforms that allow consumers to become subscribers of the content creator. As subscribers, consumers may contribute or donate money to a content creator on a recurring (e.g., weekly, monthly, annually, etc.) basis and/or per piece of content created by the content creator. Content creators may interact with subscribers and/or prospective subscribers (e.g., consumers that show interest in the content created by content creators) in a variety of ways. The subscribers may be presented recommendations for new content creators they may be interested in. This allows the content creators to reach a broader audience, as well as allow subscribers to expand their access to content.

Figure 1:
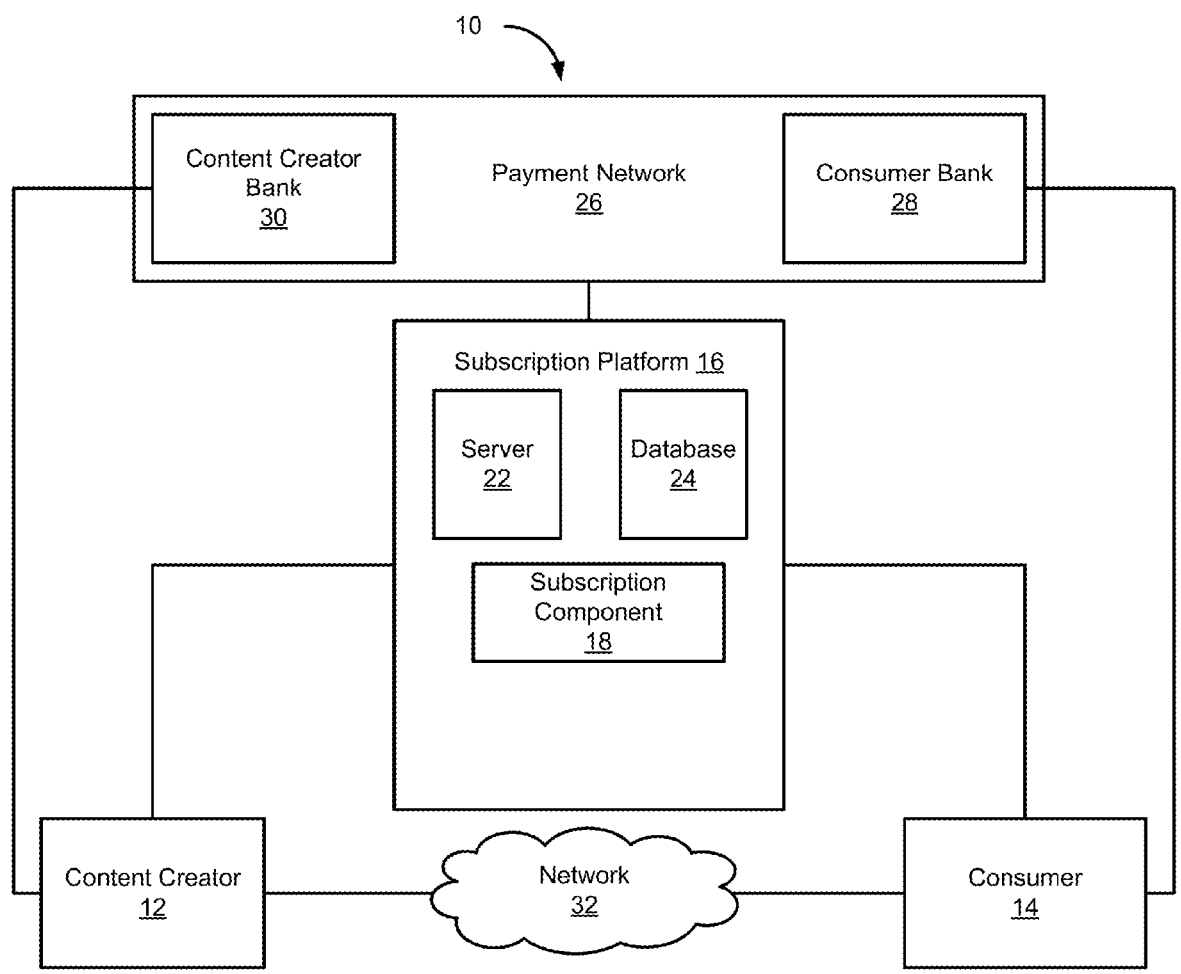
FIG. 1 illustrates an example membership system.

FIG. 1 illustrates an example subscriber-based membership system 10 (also referred to herein as a "membership platform"). A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, subscription level information specifying desired and/or initial subscription levels, preferred revenue source information (e.g., preferred currency, currency source, and/or other information), and/or other information. A page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber" or "patron") may set up a subscriber account with subscription platform 16. In setting up the subscriber account, consumer 14 may input subscriber information and/or other information. The subscriber information may also be obtained as a user continues to interact with the membership platform. By way of non-limiting illustration, subscriber information my include one or more of demographic information relevant to consumer 14 (e.g., age, income, job, etc.), information identifying the consumer, preference information, search information, subscribership information, and/or other information. The information identifying consumer 14 (e.g., name, a picture, a phone number, etc.) may be input by consumer 14 when setting up the subscriber account. The preference information may include their preferences (e.g., likes and dislikes). The preferences may be specified with respect to content type and/or other specifications. The preference information may be obtained as consumer 14 interacts with membership platform, e.g., by submitting upvotes (representing likes) and/or downvotes (representing dislikes). The search information may include search queries the subscribers have input when searching for new creators/content via the membership platform.

In some implementations, the subscribership information of the subscribers may characterize the subscribership of the individual subscribers to individual content creators. The subscribership information may include one or more of identification of individual content creators the individual subscriber subscribes to, length of subscribership to individual content creators, date of initial subscribership to individual content creators, a subscription level, lifetime contribution amount paid to individual content creators, subscriber-initiated interactions, and/or other information. The subscriber-initiated interactions may be characterized based on one or more of content of the interactions, form of the interactions, point in time of the interactions, and/or other information. The content of the interactions may include what was communicated. The form of interactions may indicate how the communication was made. By way of non-limiting illustration, communication may be made by one or more of chat, comments, posting of forum or message board, phone call, video chat, and/or other forms of communication.

Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. It is noted that although the term "bank" is used, these components may comprise one or more of banking information, credit and/or debit card information, accounts through which payments can be made, and/or other entities beyond a traditional "bank." Instead, the term "bank" may be used to refer to some source from which payment amounts may be drawn.

In some implementations, consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of benefit items including online content, physical content, and/or other content. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., Wi-Fi), a mobile communication network, a satellite network, the Internet, fiber optic, coaxial cable, infrared, radio frequency (RF) or any other suitable network. The preferential access may be provided to consumer 14 from content creator 12 via subscription platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify their desired subscription levels and corresponding preferential access, as well as their preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may be associated with one or more of subscribership information, content information, creator profile information, creation information, and/or other information. The content creator 12 may be able to change (e.g., add, delete, update, modify, etc.) such information. Such changes may be input via subscription component 18 and reflected in its local memory and/or database 24. It should be understood that content creator 12 and/or consumer 14 may be an individual or some entity representative of an individual or group of individuals.

Content information may characterize benefit items that content creator 12 creates. The content information may include information defining and/or describing one or more of the type of benefit items created, the modality in which the benefit items are created and/or presented, the amount of benefit items created, genre of the benefit items and/or content creators, frequency at which the benefit items are created, and/or other information. Types of content may include but are not limited to video content, podcasts, photographic art, webcomics, do-it-yourself crafts, digital music, performance art, painting, and/or other types of content. The modality may refer to form or format of the content and/or how the content is experienced or expressed. The content may be experienced or expressed visually, audibly, physically, and/or other information digitally. Genre may describe a theme or a topic of the content. Genre may be characterized by similarities in form, style, and/or subject matter. The "amount" may reflect that content creator 12 created a series of artwork comprising four paintings. Content frequency information may indicate that content creator 12 develops three video games over the course of six months. Such information may be stored in content database 24. By way of non-limiting illustration, content information for a given content creator 12 may indicate that the content creator 12 creates landscape paintings on canvas once a week. By way of non-limiting illustration, content information for a given content creator 12 may indicate that the content creator 12 creates comic-themed graphic art every day. By way of non-limiting illustration, content information for a given content creator 12 may indicate that the content creator 12 develops war-themed video games for a mobile platform quarterly. By way of non-limiting illustration, content information for a given content creator 12 may indicate that the content creator 12 performs in online musical performances on a monthly basis.

In some implementations, the subscribership information of the content creators may characterize the subscribership of the individual content creators. The subscribership information of the content creators may include one or more of identifying information of the subscribers to the individual content creators, length of subscribership of the individual subscribers to the individual content creators, date of initial subscribership of the individual subscribers to the individual content creators, a subscription level of the individual subscribers, subscriber rank among other subscribers to individual content creators, lifetime contribution amount by the individual subscribers, subscriber-initiated interactions, and/or other information. The identifying information of the individual subscribers may include one or more of name, username, demographics, email, and/or other information identifying an individual subscriber.

Apart from providing preferential access to consumer 14, content creator 12 may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
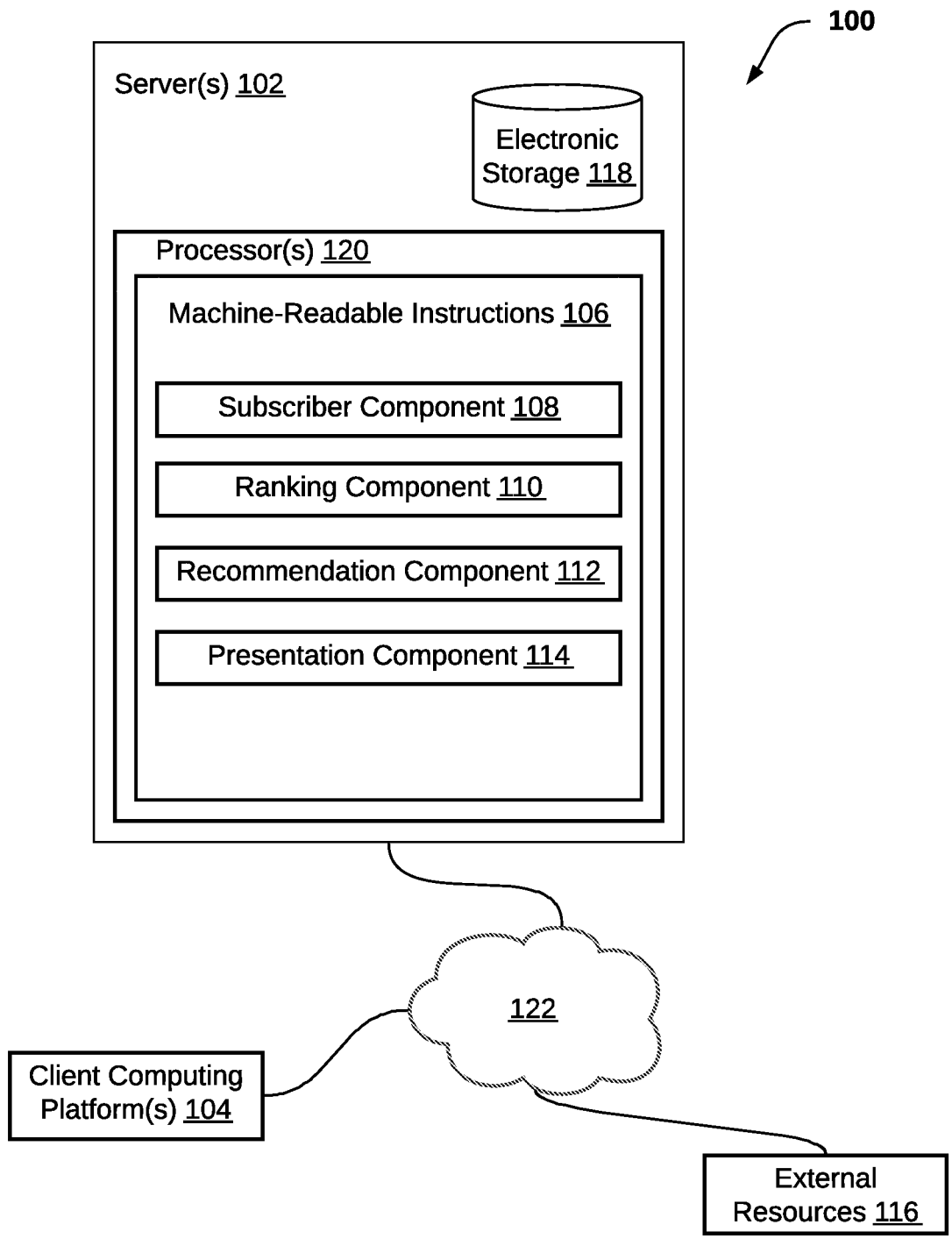
FIG. 2 illustrates a system configured to generate subscription recommendations within a membership platform, in accordance with one or more implementations.

FIG. 2 illustrates a system 100 configured to generate subscription recommendations within a membership platform. In some implementations, system 100 may include one or more of server(s) 102, client computing platform(s) 104, and/or other components. The terms "remote" computing platform, "client" computing platform, and/or "computing platform" may be used interchangeably herein to refer to individual ones of the client computing platform(s) 104. Server(s) 102 may be configured to communicate with one or more client computing platforms 104 according to a client/server architecture and/or other architectures via one or more network(s) 122. In some implementations, one or more network(s) 122 may include the Internet and/or other networks. Client computing platform(s) 104 may be configured to communicate with other client computing platforms via server(s) 102 and/or according to a peer-to-peer architecture, a client-server architecture, and/or other architectures. Users may access system 100 via client computing platform(s) 104.

It is noted the system 100 of FIG. 2 may be the same as, or included as part of, the system 10 shown in FIG. 1. For example, the server(s) 102 may be the same as or included in server 22. Network(s) 122 may be the same as or included in network 32. Individual client computing platforms of one or more client computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more computer program components. The computer program components may include one or more of a subscriber component 108, a ranking component 110, a recommendation component 112, a presentation component 114, and/or other computer program components.

Subscriber component 108 may be configured to obtain subscribership information for subscribers of a membership platform who subscribe to content creators of the membership platform. The content creators may offer benefit items to the subscribers of the membership platform who subscribe to the content creators in exchange for consideration. The subscribership information may characterize subscribership of individual ones of the subscribers to one or more of the content creators. By way of non-limiting illustration, first subscribership information for a first subscriber may specify the first subscriber's subscribership to a first content creator and/or other content creators. The first subscriber may receive benefit items from the first content creator, and/or other content creators. The first subscriber may have chosen to subscribe to the first content creator, and/or other content creators by virtue of interest in the types of benefit items they may provide.

Ranking component 110 may be configured to identify, for an individual subscriber, other ones of the subscribers who commonly subscribe to the content creators subscribed to by the individual subscriber. By way of non-limiting illustration, a second subscriber, a third subscriber, a fourth subscriber, and/or other subscribers may be identified. The second subscriber, the third subscriber, the fourth subscriber, and/or other subscribers may be subscribed to the first content creator and/or receive benefit items from the first content creator in exchange for consideration.

Ranking component 110 may be configured to identify, for individual ones of the other ones of the subscribers, other ones of the content creators the other ones of the subscribers subscribe to, but the individual subscriber does not. By way of non-limiting illustration, the second subscriber may be subscribed to a second content creator (to which the first subscriber is not subscribed); the third subscriber may be subscribed to the second content creator and a third content creator (to which the first subscriber is not subscribed); and the fourth subscriber may be subscribed to the second content creator, the third content creator, and a fourth content creator (to which the first subscriber is not subscribed).

Ranking component 110 may be configured to determine, for individual ones of the other ones of the content creators, individual quantities of the other ones of the subscribers that are commonly subscribed. This step may comprise determining the quantity of subscriber connections a given subscriber may have with these "new" unsubscribed-to content creators. By way of non-limiting illustration, the second content creator may be determined to have a quantity of three (3) subscribers that are commonly linked to the first subscriber because the second subscriber, third subscriber, and fourth subscriber subscribe to the second content creator. By way of non-limiting illustration, the third content creator may be determined to have a quantity of two (2) subscribers that are commonly linked to the first subscriber because the third subscriber and fourth subscriber subscribe to the third content creator. By way of non-limiting illustration, the fourth content creator may be determined to have a quantity of one (1) subscriber that is commonly linked to the first subscriber because the fourth subscriber subscribes to the fourth content creator.

Ranking component 110 may be configured to rank the other ones of the content creators based on one or more of the individual quantities, individual weights, and/or other information. The rank may be used to determine which content creator(s) may be subject to a subscription recommendation. In some implementations, content creators having relatively higher quantities of the subscribers that are commonly subscribed may be ranked relatively higher. By way of non-limiting illustration, the second content creator may be ranked higher than the third content creator and/or the fourth content creator; and the third content creator may be ranked higher than the fourth content creator. It is noted that "quantities" is provided only as an illustrative example and is not to be considered limiting. Instead, ratios or other mathematical functions of those quantities and/or other relevant quantities may be determined and/or used for the ranking.

In some implementations, ranking component 110 may be configured to weight individual ones of the other ones of the content creators based on weighting criteria and/or other information. In some implementations, the weighting criteria may include one or more of subscribership size criterion, type of the benefit items criterion, recommendation history criterion, pledge amount criterion, and/or other criteria. Subscribership size criterion may be associated with the quantity of subscribers a content creator has. The type of the benefit items criterion may be associated with the type of benefit items a content creator creates. The recommendation history criterion may be associated with one or more of a number of times an individual content creator has been recommended in the past, a success rate of gaining new subscribers based on past recommendation, and/or other information. The pledge amount criterion may be associated with an amount of funds a content creator has received. The amount may be measured as one or more of a total, average, a per-time period measure, and/or other measures.

Weighting may impact the ranking so that content creators having the relatively higher quantities of the subscribers that are commonly subscribed may not necessarily be ranked relatively higher. For example, individual weights may be applied to one or more of the criteria. A weight may include a value between zero and 1. A value of zero may be the lowest weight; a value of 1 may be the highest weight. By applying weighting to the criteria, and using the weighted criteria to impact rank, a content creator that satisfies a higher weighted criterion may be ranked higher relative to content creators that do not satisfy the weighted criterion and/or are associated with a higher quantity of subscribers that are commonly subscribed.

By way of non-limiting illustration, a subscribership size criterion may be specified as "having a subscribership size of 100 or less subscribers." Weighting the subscribership size criterion heavily may cause content creators with 100 or less subscribers to be ranked higher than content creators having more than 100 subscribers and/or content creators having a relatively higher number of subscribers that are commonly subscribed. By way of non-limiting illustration, the type of the benefit items criterion may be specified as "podcasts." Weighting the type of the benefit items criterion heavily may cause content creators who create podcasts to be ranked higher than content creators that do not create podcasts and/or content creators having a relatively higher number of subscribers that are commonly subscribed. By way of non-limiting illustration, the recommendation history criterion may be specified as "never been recommended." Weighting the recommendation history criterion heavily may cause content creators who have never been recommended to be ranked higher than content creators who have been recommended and/or content creators having a relatively higher number of subscribers that are commonly subscribed.

Recommendation component 112 may be configured to generate one or more subscription recommendations for one or more of the other ones of the content creators based on the rank and/or other information. An individual subscription recommendation may include a recommendation to subscribe to an individual content creator and/or other content creators and/or other information. In some implementations, an individual subscription recommendation may include a link to a creator page for the content creator, a preview of the content of the content creator, and/or other content.

In some implementations, recommendation component 112 may be configured to obtain subscription context information and/or other information. The subscription context information may include subscribership criteria required to be satisfied in order for individual subscription recommendations to be presented to the individual subscriber. In some implementations, subscription context information may be different for individual subscribers. In some implementations, subscription context information may include information that applies system-wide to all subscribers.

In some implementations, the subscribership criteria may be related to preferences of the individual subscriber and/or other information. The preferences may be specified with respect to one or more of type of benefit item, location of content creator, cost of subscription, and/or other preferences. Preferences may be determined through input by the subscribers into a form, questionnaire, and/or considerations. In some implementations, subscribers may provide upvotes and/or downvotes on certain content creators which may translate to preferences. The subscribership criteria may include that the content creators being recommended fall within the preferences of the subscriber.

In some implementations, the subscribership criteria may include system-wide business preferences. The system-wide business preferences may include general business considerations such as age appropriateness of content and/or other considerations. By way of non-limiting illustration, subscribership criteria may include limiting 18+ content to the appropriate age range.

By way of non-limiting illustration, a subscriber's preferences may indicate they prefer content creators whose subscriptions cost under a first price point. A subscriber's preference may indicate they prefer content creators whose benefit items are video content and/or other types of benefit items.

In some implementations, recommendation component 112 may be configured to identify which content creator(s) satisfy the subscribership criteria. The recommendation component 112 may be configured to obtain one or more of creator information, subscriber information, and/or other information to determine which content creator(s) satisfy the subscribership criteria.

In some implementations, recommendation component 112 may be configured to obtain subscriber information and/or other information to determine at least some of subscribership criteria. In some implementations, the subscriber information may characterize the subscribers. By way of non-limiting illustration, subscriber information may include preferences and/or other information. The subscriber information may be obtained from the subscriber through one or more of surveys, quizzes, feedback reviews, and/or other methods of obtaining information.

In some implementations, recommendation component 112 may be configured to obtain creator information and/or other information. Creator information may characterize content creators and/or the benefit items offered by the content creators. By way of non-limiting illustration, creator information may include information regarding the type of content of a content creator, the local of the content creator, the price of the subscription to the content creator, and/or other information regarding the content creator.

In some implementations, recommendation component 112 may be configured to determine whether the subscribership criteria are satisfied based on the creator information for the other ones of the content creators. By way of non-limiting illustration, content creators whose subscriptions cost more than the first price point may not satisfy the subscribership criteria. Content creators who do not produce video content as benefit items may not satisfy the subscribership criteria. Content creators who produce 18+ content may not satisfy the subscribership criteria when the subscriber is younger than 18.

Presentation component 114 may be configured to effectuate presentation of the one or more subscription recommendations to individual computing platforms of individual subscribers. In some implementations, presentation component 114 may be configured to effectuate presentation of subscription recommendations for content creators having creator information that satisfy the subscribership criteria.

The computing platforms of the subscriber may be configured to effectuate presentation of a user interface of the membership platform. In some implementations, the subscription recommendations may be presented within the user interface.

In some implementations, subscription recommendations may be presented outside of the membership platform. In some implementations, presentation component 114 may be configured to send out subscription recommendations outside of the membership platform using a messaging service. In some implementations, a messaging service may include one or more of SMS text message, email, social media platform, and/or other communication channels.

While the features and/or functionality presented above are described with respect to automating subscription recommendations to be sent to subscribers, this is for illustrative purpose only. Instead, in some implementations, the system 100 may be implemented for content creators to generate and deliver subscription recommendations for other creators to their current subscribers. Such an implementation may utilize the creator's own subscribership networks to generate recommendations that ultimately may help the recommending-creator. By way of non-limiting illustration, by analyzing the subscribership networks of the creators themselves, the content creators may be shown related or linked content creators that ultimately lead to further growth within their own accounts. The content creators may provide inputs such as the weighting criteria, weights, subscribership criteria, and/or other information. The content creators may elect to send recommendations directly to their subscribers (e.g., showing that it originated from the content creator themself).

In some implementations, recommendation component 112 may be configured to monitor results of the subscription recommendations. The results may include one or more of a subscriber subscribed to a recommended content creator, a time period between presentation of a recommendation and a new subscription being made, a subscriber did not subscribe to a recommended content creator, a subscriber viewed a recommendation, a subscriber ignored a recommendation, and/or other results.

In some implementations, recommendation component 112 may be configured to provide the results to the ranking component 110 so that the ranking and/or the weighting of content creators performed by the ranking component 110 may be updated, revised, tuned, and/or retrained based on the results. By way of non-limiting illustration, the ranking and/or weighting performed by ranking component 110 may utilize one or more machine learning models and/or other techniques. The results may be provided back into a machine learning model to tune and/or retrain the model. In some implementations, the results of the subscription recommendations may be used to update preferences of the subscribers. By way of non-limiting illustration, generating a new subscription for a content creator may convey a preference for the modality and/or genre of that creator. This may feed back into the ranking and/or weighting so that content creators of that modality and/or genre may be ranked relatively higher and/or weighted relatively more.

In FIG. 2, in some implementations, server(s) 102, client computing platform(s) 104, and/or external resource(s) 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resource(s) 116 may be operatively linked via some other communication media.

A given client computing platform may include one or more processors configured to execute one or more computer program components. The computer program components may be configured to enable an expert or user associated with the given client computing platform to interface with system 100, system 10, and/or external resource(s) 116, and/or provide other functionality attributed herein to client computing platform(s) 104. By way of non-limiting example, a client computing platform may include one or more of a desktop computer, a laptop computer, a handheld computer, a tablet computing platform, a NetBook, a Smartphone, a gaming console, and/or other computing platforms.

External resource(s) 116 may include sources of information outside of system 100, external entities participating with system 100, and/or other resources. In some implementations, some or all of the functionality attributed herein to external resource(s) 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 2 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 2 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 3:
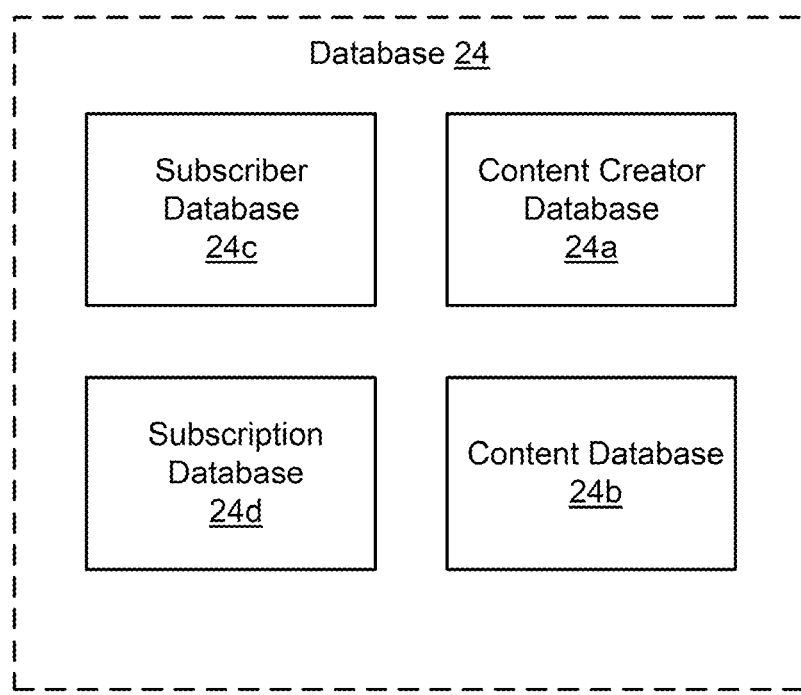
FIG. 3 illustrates an example database.

FIG. 3 illustrates elements that may make up database 24 of FIG. 1. As indicated previously, subscription component 18 of FIG. 1 may transmit information input by content creator 12 and/or consumer 14 regarding content information, subscribership information, and/or other information to database 24. Subscription platform 16, via server 22, for example, may monitor and obtain creation and/or subscribership information for storage in database 24. For example, subscription platform 16 may monitor and store additional information as well as performance-related subscribership information, e.g., engagement activity between content creator 12 and his/her subscribers, one of whom may be consumer 14. For example, subscription platform 16 of FIG. 1 may monitor the amount of money being generated and/or lost through the subscribers (e.g., outcome information), as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, in FIG. 3, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with one or more of content information, creator profile information, subscriber information, subscribership information, and/or other information.

Creator profile information characterizing content creator may be stored in content creator database 24a. The creator profile information may be information reflecting the creator type that a content creator designates him/herself to be and/or other self-identified preferences regarding subscription offerings by the content creator. For example, content creator type may reflect that content creator may be a paint artist, a digital artist, a sculptor, a video game developer, a writer, a performance artist, etc. Content creator preferences may reflect subscription levels the content creator wishes to offer to subscribers. Content creator preferences may reflect, e.g., a desired minimum revenue, preferred sources of revenue, subscription level proportions, etc. For example, the content creator preferences may include information indicating content creator's desire for more subscribers pledging some amount of money or less subscribers pledging a greater amount of money. For example, content creator preferences may include information specifying that content creator wishes to supplement his/her subscription-generated revenue with revenue generated from the sale of promotional merchandise.

In addition to content creation-related information, and upon registering with subscription platform as a content creator, content creator may input information characterizing the identity of the content creator. For example, the content creator may input or upload contact information, a telephone number associated with a personal user device, such as smartphone, an email address, a photograph, and/or other identifying information. Such identifying information may be used by subscription platform in a variety of ways to associate the content creator with particular content, his/her webpage, payment of subscription donations, and/or other information.

Consumers may subscribe to content creators by registering with subscription platform. During registration, consumers may input certain subscriber demographic information indicative of economic and/or social characteristics. Subscriber demographic information may reflect the yearly income of consumers, a geographic area in which consumer resides, the age of consumer, interests of consumer, etc. Subscriber information may include data regarding the amount of money consumer is currently pledged to donate to one or more content creators, and/or other information. Over time, as monitored and collected by subscription platform, subscriber information may include information regarding the amount of money consumer has previously donated to one or more content creators and/or other information. Subscriber information, as monitored and obtained by the subscription platform may include an Internet Protocol (IP) address indicative of a current location of a consumer and/or an IP address indicating a payment source. Such information may be stored in subscriber database 24c.

Like content creators, consumers may input or upload other identifying information. For example, a photograph or phone number of a consumer may be used. Such information may be stored in subscriber database 24c.

Subscription level information may refer to information characterizing different subscription levels and corresponding preferential access information specified by content creators. For example, subscription level information may reflect that a ten-dollar recurring donation is rewarded with a high-resolution digital image of artwork created during that month to consumers. Such subscriber level information may be stored in subscription database 24d. Subscribership information may be stored in subscription database 24d and/or other storage location.

It should be noted that other databases or partitions may make up database 24. For example, database 24 may include one or more databases or partitions for storing information including, but not limited to the following: preferential access information characterizing activity in which content creator engagements may refer to data reflecting the type of activity, the level and/or exclusivity of preferential access to that activity granted to consumer; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership, is contemplated by the disclosure. For example, preferential access need not necessarily be offered for each subscription level. For example, subscriber data may include data reflecting particular content creators to which a subscriber pledges donations.

Figure 4:
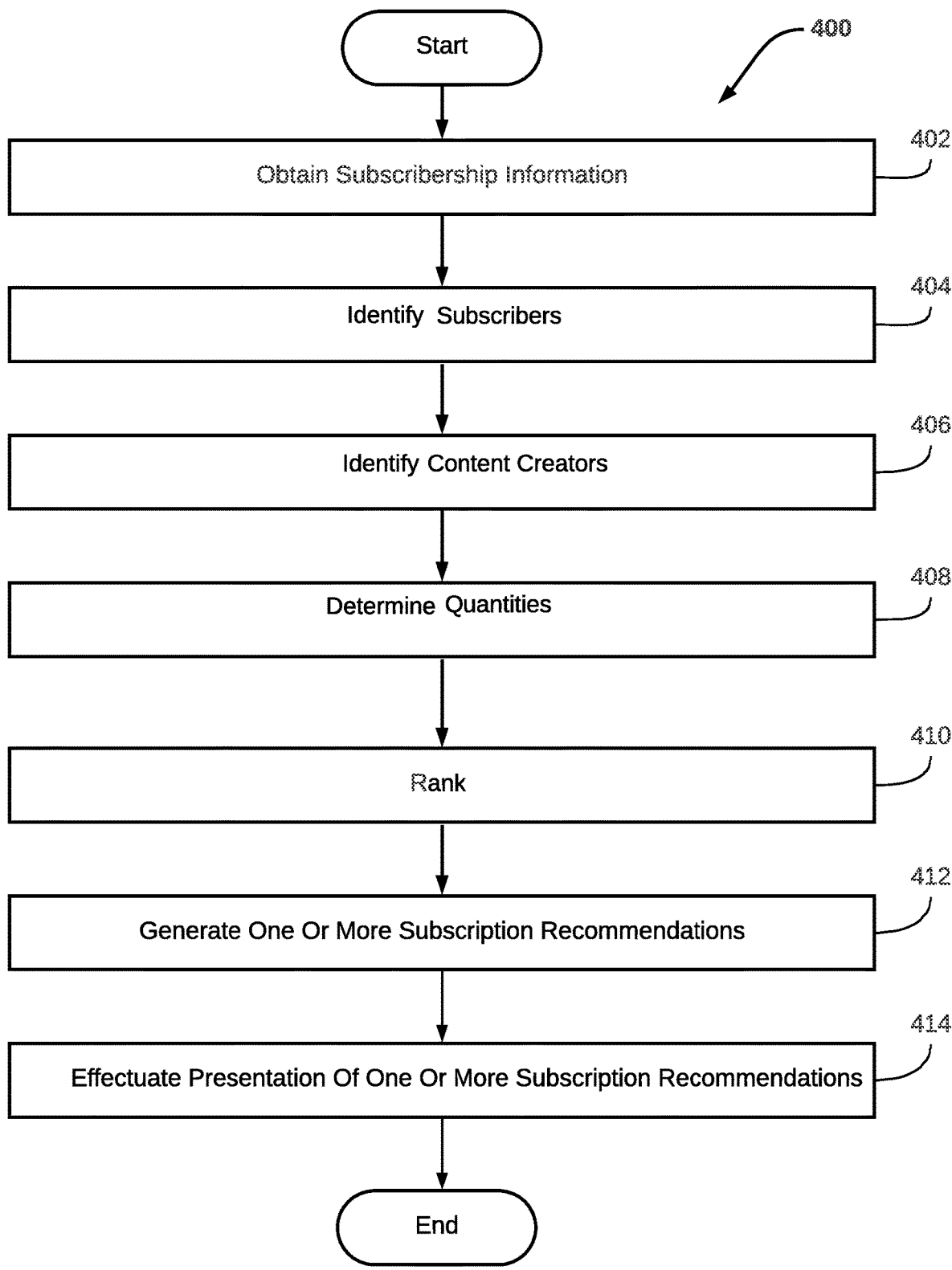
FIG. 4 illustrates a method to generate subscription recommendations within a membership platform, in accordance with one or more implementations.

FIG. 4 illustrates a method 400 to generate subscription recommendations within a membership platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a physical processor, digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining subscribership information for subscribers of a membership platform who subscribe to content creators of the membership platform. The content creators may offer benefit items to the subscribers of the membership platform who subscribe to the content creators in exchange for consideration. The subscribership information may characterize subscribership of individual ones of the subscribers to one or more of the content creators. Operation 402 may be performed by one or more hardware processors configured by machine-readable instructions including a component that is the same as or similar to subscriber component 108.

An operation 404 may include, for an individual subscriber, identifying other ones of the subscribers who commonly subscribe to the content creators subscribed to by the individual subscriber. Operation 404 may be performed by one or more hardware processors configured by machine-readable instructions including a component that is the same as or similar to ranking component 110.

An operation 406 may include, for individual ones of the other ones of the subscribers, identifying other ones of the content creators the other ones of the subscribers subscribe to, but the individual subscriber does not. Operation 406 may be performed by one or more hardware processors configured by machine-readable instructions including a component that is the same as or similar to ranking component 110.

An operation 408 may include, for individual ones of the other ones of the content creators, determining individual quantities of the other ones of the subscribers that are commonly subscribed. Operation 408 may be performed by one or more hardware processors configured by machine-readable instructions including a component that is the same as or similar to ranking component 110.

An operation 410 may include ranking the other ones of the content creators based on the individual quantities and/or other information. Operation 410 may be performed by one or more hardware processors configured by machine-readable instructions including a component that is the same as or similar to ranking component 110.

An operation 412 may include generating one or more subscription recommendations for one or more of the other ones of the content creators based on the rank and/or other information. By way of non-limiting example, an individual subscription recommendation may include a recommendation to subscribe to an individual content creator. Operation 412 may be performed by one or more hardware processors configured by machine-readable instructions including a component that is the same as or similar to recommendation component 112.

An operation 414 may include effectuating presentation of the one or more subscription recommendations to an individual computing platform of the individual subscriber. Operation 414 may be performed by one or more hardware processors configured by machine-readable instructions including a component that is the same as or similar to presentation component 114.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A system configured to generate individualized subscription recommendations within a membership platform, the system comprising:
   non-transitory electronic storage storing subscribership information describing subscribers of a membership platform who subscribe to content creators of the membership platform, the content creators offering benefit items to the subscribers of the membership platform who subscribe to the content creators in exchange for consideration, the subscribership information characterizing subscribership of individual ones of the subscribers to one or more of the content creators, the subscribers including a first subscriber subscribing to a first content creator; and
   one or more physical processors configured by machine-readable instructions to:
      for an individual subscriber, identify other ones of the subscribers who commonly subscribe to the content creators subscribed to by the individual subscriber, including for the first subscriber, identify a first set of subscribers that commonly subscribe to the first content creator, the first set of subscribers corresponding with the first subscriber by virtue of common subscribership to the first content creator, the first set of subscribers including a second subscriber and a third subscriber;
      for individual ones of the other ones of the subscribers, identify other ones of the content creators the other ones of the subscribers subscribe to, but the individual subscriber does not, including for the second subscriber, identify a second content creator that the second subscriber subscribes to but the first subscriber does not, and for the third subscriber, identify a third content creator that the third subscriber subscribes to but the first subscriber does not;
      for individual ones of the other ones of the content creators that the individual subscriber does not subscribe to, determine individual quantities of the other ones of the subscribers that are commonly subscribed, including for the second content creator, determine a first quantity of the subscribers in the first set of subscribers that subscribe to the second content creator, and for the third content creator, determine a second quantity of the subscribers in the first set of subscribers that subscribe to the third content creator;
      rank the other ones of the content creators that the individual subscriber does not subscribe to based on the individual quantities, including the second content creator and the third content creator are ranked based on the first quantity and the second quantity, respectively;
      generate recommendation information defining one or more individualized subscription recommendations for the individual subscriber, the one or more individualized subscription recommendations recommending one or more of the other ones of the content creators based on the rank, an individual individualized subscription recommendation for the individual subscriber including a recommendation to subscribe to an individual content creator that the individual subscriber does not subscribe to, such that first recommendation information defines a first individualized subscription recommendation for the first subscriber that recommends the second content creator based on ranking of the second content creator and the third content creator, the first individualized subscription recommendation including a recommendation that the first subscriber subscribe to the second content creator;
      establish an individual Internet connection between a server managing the membership platform and an individual computing platform associated with the individual subscriber; and
      effectuate communication of the recommendation information from the server to the individual computing platform to cause the individual computing platform to present the one or more individualized subscription recommendations for the individual subscriber within a user interface of the membership platform, such that the first recommendation information is communicated from the server to a first computing platform associated with the first subscriber to cause the first computing platform to present the first individualized subscription recommendation for the first subscriber within the user interface of the membership platform.

2. The system of claim 1, wherein the one or more physical processors are further configured by the machine-readable instructions to:
    weight the individual ones of the other ones of the content creators based on weighting criteria; and
    rank the other ones of the content creators based on the individual quantities and the weight.

3. The system of claim 2, wherein the weighting criteria include one or more of subscribership size of the individual content creator, type of the benefit items offered by the individual content creator, recommendation history, or pledge amount received by the individual content creator.

4. The system of claim 3, wherein the weighting criteria include the recommendation history, the recommendation history including number of times the individual content creator has been recommended in the past, or a success rate of gaining new subscribers based on past recommendation.

5. The system of claim 1, wherein the one or more physical processors are further configured by the machine-readable instructions to:
    obtain subscription context information, the subscription context information including subscribership criteria required to be satisfied in order for individual individualized subscription recommendations to be presented to the individual subscriber.

6. The system of claim 5, wherein the one or more physical processors are further configured by the machine-readable instructions to:
    obtain creator information characterizing the content creators and/or the benefit items offered by the content creators;
    determine whether the subscribership criteria is satisfied based on the creator information for the other ones of the content creators; and
    effectuate presentation of the one or more individualized subscription recommendations based on the creator information for the one or more of the other ones of the content creators satisfying the subscribership criteria.

7. The system of claim 6, wherein the subscribership criteria include age-appropriateness of the benefit items.

8. The system of claim 7, wherein the one or more physical processors are further configured by the machine-readable instructions to:
    obtain subscriber information characterizing the subscribers;
    determine the subscribership criteria based on the subscriber information for the individual subscriber.

9. The system of claim 8, wherein the subscribership criteria include preferences of the individual subscriber.

10. The system of claim 1, wherein individual individualized subscription recommendations include individual links to access individual creator pages of the individual ones of the content creators, such that the first individualized subscription recommendation includes a first link to a creator page of the second content creator, wherein selection of the first link of the first individualized subscription recommendation causes the first computing platform to present the creator page within the user interface.

11. A method to generate individualized subscription recommendations within a membership platform, the method comprising:
    obtaining electronically stored subscribership information for subscribers of a membership platform who subscribe to content creators of the membership platform, the content creators offering benefit items to the subscribers of the membership platform who subscribe to the content creators in exchange for consideration, the subscribership information characterizing subscribership of individual ones of the subscribers to one or more of the content creators, the subscribers including a first subscriber subscribing to a first content creator;
    for an individual subscriber, identifying other ones of the subscribers who commonly subscribe to the content creators subscribed to by the individual subscriber, including identifying, for the first subscriber, a first set of subscribers that commonly subscribe to the first content creator, the first set of subscribers corresponding with the first subscriber by virtue of common subscribership to the first content creator, the first set of subscribers including a second subscriber and a third subscriber;
    for individual ones of the other ones of the subscribers, identifying other ones of the content creators the other ones of the subscribers subscribe to, but the individual subscriber does not, including identifying, for the second subscriber, a second content creator that the second subscriber subscribes to but the first subscriber does not, and identifying, for the third subscriber, a third content creator that the third subscriber subscribes to but the first subscriber does not;
    for individual ones of the other ones of the content creators that the individual subscriber does not subscribe to, determining individual quantities of the other ones of the subscribers that are commonly subscribed, including determining, for the second content creator, a first quantity of the subscribers in the first set of subscribers that subscribe to the second content creator, and determining, for the third content creator, a second quantity of the subscribers in the first set of subscribers that subscribe to the third content creator;
    ranking the other ones of the content creators that the individual subscriber does not subscribe to based on the individual quantities, including ranking the second content creator and the third content creator based on the first quantity and the second quantity, respectively;
    generating recommendation information defining one or more individualized subscription recommendations for the individual subscriber, the one or more individualized subscription recommendations recommending one or more of the other ones of the content creators based on the ranking, an individual individualized subscription recommendation for the individual subscriber including a recommendation to subscribe to an individual content creator that the individual subscriber does not subscribe to, including generating first recommendation information defining a first individualized subscription recommendation for the first subscriber that recommends the second content creator based on the ranking of the second content creator and the third content creator, the first individualized subscription recommendation including a recommendation that the first subscriber subscribe to the second content creator;
    establishing an individual Internet connection between a server managing the membership platform and an individual computing platform associated with the individual subscriber; and
    effectuating communication of the recommendation information from the server to the individual computing platform to cause the individual computing platform to present the one or more individualized subscription recommendations for the individual subscriber within a user interface of the membership platform, including communicating the first recommendation information from the server to a first computing platform associated with the first subscriber to cause the first computing platform to present the first individualized subscription recommendation for the first subscriber within the user interface of the membership platform.

12. The method of claim 11, further comprising:
weighting the individual ones of the other ones of the content creators based on weighting criteria; and
ranking the other ones of the content creators based on the individual quantities and the weighting.

13. The method of claim 12, wherein the weighting criteria include one or more of subscribership size of the individual content creator, type of the benefit items offered by the individual content creator, recommendation history, cost of subscription, or pledge amount received by the individual content creator.

14. The method of claim 13, wherein the weighting criteria include the recommendation history, the recommendation history including number of times the individual content creator has been recommended in the past, or a success rate of gaining new subscribers based on past recommendation.

15. The method of claim 11, further comprising:
obtaining subscription context information, the subscription context information including subscribership criteria required to be satisfied in order for individual individualized subscription recommendations to be presented to the individual subscriber.

16. The method of claim 15, further comprising:
obtaining creator information characterizing the content creators and/or the benefit items offered by the content creators;
determining whether the subscribership criteria is satisfied based on the creator information for the other ones of the content creators; and
effectuating presentation of the one or more individualized subscription recommendations based on the creator information for the one or more of the other ones of the content creators satisfying the subscribership criteria.

17. The method of claim 16, wherein the subscribership criteria include age-appropriateness of the benefit items.

18. The method of claim 17, further comprising:
obtaining subscriber information characterizing the subscribers;
determining the subscribership criteria based on the subscriber information for the individual subscriber.

19. The method of claim 18, wherein the subscribership criteria include preferences of the individual subscriber.

20. The method of claim 11, wherein individual individualized subscription recommendations include individual links to access individual creator pages of the individual ones of the content creators, such that the first individualized subscription recommendation includes a first link to a creator page of the second content creator, wherein selecting the first link of the first individualized subscription recommendation causes the first computing platform to present the creator page within the user interface.

* * * * *